US009427894B2

(12) United States Patent
Kamiyama et al.

(10) Patent No.: US 9,427,894 B2
(45) Date of Patent: Aug. 30, 2016

(54) ANTI-REFLECTION ARTICLE

(71) Applicant: DAI NIPPON PRINTING CO., LTD., Tokyo (JP)

(72) Inventors: Hironori Kamiyama, Tokyo (JP); Toshiaki Satou, Tokyo (JP); Minoru Yamamoto, Tokyo (JP); Tsukasa Ayuzawa, Tokyo (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 206 days.

(21) Appl. No.: 14/237,772

(22) PCT Filed: Sep. 27, 2013

(86) PCT No.: PCT/JP2013/076378
§ 371 (c)(1),
(2) Date: Feb. 7, 2014

(87) PCT Pub. No.: WO2014/051094
PCT Pub. Date: Apr. 3, 2014

(65) Prior Publication Data
US 2015/0298363 A1 Oct. 22, 2015

(30) Foreign Application Priority Data

Sep. 28, 2012 (JP) ................. 2012-218204

(51) Int. Cl.
*B29C 33/38* (2006.01)
*G02B 1/118* (2015.01)
(Continued)

(52) U.S. Cl.
CPC ........... *B29C 33/38* (2013.01); *B29C 33/3857* (2013.01); *B29C 33/42* (2013.01);
(Continued)

(58) Field of Classification Search
CPC ... B29C 33/38; B29C 33/42; B29C 33/3857; B29C 33/424; B29C 43/3697; B29C 43/021; B29C 37/0053; B29C 43/36; B32B 17/00; C03B 11/082; G02B 1/118; B29L 2011/0016
See application file for complete search history.

(56) References Cited

U.S. PATENT DOCUMENTS 6,359,735 B1 3/2002 Gombert et al.
2003/0102286 A1 6/2003 Takahara et al.
(Continued)

FOREIGN PATENT DOCUMENTS

JP A-2001-272505 10/2001
JP A-2001-517319 10/2001
(Continued)

OTHER PUBLICATIONS

Jan. 14, 2014 International Search Report and Written Opinion issued in International Patent Application No. PCT/JP2013/076378 (with partial translation).
(Continued)

*Primary Examiner* — Galen Hauth
(74) *Attorney, Agent, or Firm* — Oliff PLC

(57) ABSTRACT

Provided is an inexpensive anti-reflection article with a sufficient anti-reflection property by using an anti-reflection article manufacturing mold plate manufactured at low cost. In a method of manufacturing an anti-reflection article manufacturing mold plate used to manufacture an anti-reflection article provided with an anti-reflection surface in which minute convex portions or minute concave portions are densely arranged and a gap between the adjacent minute convex portions or minute concave portions is the shortest wavelength or less of a wavelength band for anti-reflection, the method of manufacturing an anti-reflection article manufacturing mold plate includes: molding an uneven shape on a surface of a receptive layer by causing an anti-reflection surface of another anti-reflection article to come into pressure-contact with the surface of the receptive layer including a curable base; and curing the receptive layer in which the uneven shape is molded.

8 Claims, 4 Drawing Sheets

(51) Int. Cl.
- *B29C 37/00* (2006.01)
- *B29C 43/02* (2006.01)
- *B29C 33/42* (2006.01)
- *C03B 11/08* (2006.01)
- *B32B 17/00* (2006.01)
- *B29C 43/36* (2006.01)
- *B29L 11/00* (2006.01)

(52) U.S. Cl.
CPC ........ *B29C 33/424* (2013.01); *B29C 37/0053* (2013.01); *B29C 43/021* (2013.01); *B29C 43/3697* (2013.01); *B32B 17/00* (2013.01); *C03B 11/082* (2013.01); *G02B 1/118* (2013.01); *B29C 43/36* (2013.01); *B29L 2011/0016* (2013.01)

(56) References Cited

U.S. PATENT DOCUMENTS

2005/0093210 A1* 5/2005 Umetani ............... C03B 11/082
264/528

2009/0257127 A1* 10/2009 Okayama ................. G02B 1/11
359/601
2013/0078333 A1* 3/2013 Kumazawa ......... B29C 33/3878
425/470

FOREIGN PATENT DOCUMENTS

| | | |
|---|---|---|
| JP | A-2002-286906 | 10/2002 |
| JP | A-2003-090902 | 3/2003 |
| JP | A-2003-149405 | 5/2003 |
| JP | A-2004-205990 | 7/2004 |
| JP | A-2004-287238 | 10/2004 |
| JP | A-2005-156695 | 6/2005 |
| JP | A-2007-216493 | 8/2007 |
| JP | A-2010-719 | 1/2010 |
| JP | A-2012-148481 | 8/2012 |
| WO | WO 2006/059686 A1 | 6/2006 |

OTHER PUBLICATIONS

Office Action issued in Japanese Patent Application No. 2012-218204 mailed Jun. 4, 2013.

* cited by examiner (A)

(B)

ULTRAVIOLET LIGHT (C)

(D)

US 9,427,894 B2

ANTI-REFLECTION ARTICLE

TECHNICAL FIELD

The present invention relates to an anti-reflection article that exhibits an anti-reflection function by densely arranging a plurality of minute convex portions or concave portions (hereinafter, generally referred to as "minute uneven portions") with a gap of the shortest wavelength or less of a wavelength band of an electromagnetic wave for anti-reflection.

BACKGROUND ART

In recent years, various methods of manufacturing an anti-reflection film as a film-shaped anti-reflection article have been proposed by densely arranging a plurality of minute convex portions on the surface of a transparent base (transparent film) for an anti-reflection function (see Patent Documents 1 to 6). In these methods, the principle of the so-called moth eye structure is used. Specifically, the refractive index for incident light is continuously changed in the thickness direction of a substrate so as to remove a boundary face of non-continuous refractive indexes, and hence an anti-reflection function is obtained.

In general, such a moth eye structure is manufactured by transferring (molding) an uneven surface shape in an arbitrary resin layer using a manufacturing molding plate such as a mold having a shape in which a minute uneven surface shape with a plurality of minute convex portions is reversed. Accordingly, as a method of manufacturing the anti-reflection film with the moth eye structure, a method stay be used in which a resin layer is formed on a substrate by a curable base such as an ultraviolet curable resin, a moth eye structure is molded in the surface of the resin layer by using the above-described manufacturing molding plate, and the resin layer is cured. According to such a manufacturing method, it is possible to continuously manufacture an anti-reflection film by a simple method and with high efficiency.

Furthermore, a mold (for example, see Patent Documents 1 to 3) having a concave portion formed by laser interferometry or a mold (for example, see Patent Documents 4 to 6) having a concave portion formed by an anodization method is used as the molding plate of the moth eye structure. Among these, since the anodization method has advantages in which a concave portion forming position may be set randomly and the concave portion may be formed with a uniform shape in a large area, the molding plate formed by the anodization method is widely used as the anti-reflection article manufacturing mold plate.

It is desirable to manufacture the anti-reflection article with high efficiency according to a roll-to-roll process by using a so-called roll plate of which a peripheral surface is provided with an uneven surface shape provided to mold the moth eye structure as a molding plate. Thus, various methods have been proposed for manufacturing an anti-reflection article by using such a roll plate (see Patent Document 7).

Incidentally, there is a case in which the properties of the anti-reflection article are degraded due to the degradation of the roll plate used for the manufacturing process for a long period of time. The present inventor has carefully examined this drawback and has found that some defects occur in certain points or areas of the roll plate because the molded minute uneven structure adheres to the resin layer provided for the molding process and is partially peeled off from the mold when the minute uneven structure is peeled off from the mold.

When the mold is degraded, there is a need to manufacture a mold having the same minute uneven structure as that of the mold before degradation and to replace the old mold with the new one. As a method of reducing the high cost incurred when exchanging the mold, Patent Document 2 discloses a method in which a replicative mold (master die) manufactured by a replicating process of obtaining and reversing the minute uneven surface shape once or at least twice is used as the mold used to mold the moth eye structure instead of the original mold (mother die) having the minute surface uneven shape formed thereon initially. Since the master die of the mold may be easily manufactured again from, the mother die, this method is excellent from the viewpoint of industrial productivity and cost, and hence the mold may be easily replaced when the mold is degraded.

However, even when the mold is, for example, a resinous molding plate, if such an anti-reflection article manufacturing mold plate is manufactured again for the replacement of the mold whenever slight degradation occurs, the replacement still causes a large increase in the running cost of the anti-reflection film manufacturing line in spite of the above-described method contrived by the examination. For this reason, there has been a demand for a new method for reducing the running cost of the entire manufacturing line.

[Patent Document 1] Japanese Unexamined Patent Application (Translation of PCT Application), Publication No. 2001-517319

[Patent Document 2] Japanese Unexamined Patent Application, Publication No. 2004-205990

[Patent Document 3] Japanese Unexamined Patent Application, Publication No. 2004-287238

[Patent Document 4] Japanese Unexamined Patent Application, Publication No. 2001-272505

[Patent Document 5] Japanese Unexamined Patent Application, Publication No. 2002-286906

[Patent Document 6] Pamphlet of PCT International Publication No. WO2006/059686

[Patent Document 7] Japanese Unexamined Patent Application, Publication No. 2005-156695

DISCLOSURE OF THE INVENTION

Problems to be Solved by the Invention

The present invention is made in view of such circumstances, and an object of the present invention is to provide an inexpensive anti-reflection article with a sufficient anti-reflection property by the use of an anti-reflection article manufacturing mold plate manufactured at extremely low cost.

Means for Solving the Problems

The present inventor has repeated a careful examination in order to solve the above-described problems, and has found that an anti-reflection article having the same desirable optical characteristics may be manufactured at extremely low cost by using another anti-reflection article having the same anti-reflection surface shape as a master die for manufacturing the anti-reflection article manufacturing mold plate. As a result, the present invention is contrived.

Specifically, the present invention provides the following techniques.

(1) A method of manufacturing an anti-reflection article manufacturing mold plate used to manufacture an anti-reflection article provided with an anti-reflection surface in which minute convex portions or minute concave portions are densely arranged and the gap between the adjacent minute convex portions or minute concave portions is the shortest wavelength or less of a wavelength band for anti-reflection, the method of manufacturing an anti-reflection article manufacturing mold plate including: molding an uneven shape in the surface of a receptive layer by causing an anti-reflection surface of another anti-reflection article to come into pressure-contact with the surface of the receptive layer including a curable base; and curing the receptive layer in which the uneven shape is molded, wherein in the another anti-reflection article, the anti-reflection surface is formed in a manner such that another anti-reflection article manufacturing mold plate comes into pressure-contact with the surface of the uncured receptive layer so as to mold an uneven shape in the surface of the receptive layer and the receptive layer is cured.

According to the item (1), it is possible to provide the molding plate capable of manufacturing another anti-reflection article having the same desirable properties as those of one anti-reflection article at extremely low cost.

(2) A method of manufacturing an anti-reflection article including: molding an uneven shape on a surface of a receptive layer by causing the anti-reflection article manufacturing mold plate manufactured by the manufacturing method according to the item (1) to come into pressure-contact with the surface of the uncured receptive layer; curing the uncured receptive layer in which the uneven shape is molded; and causing the anti-reflection article manufacturing mold plate to be peeled off from, the receptive layer.

According to the item (2), it is possible to provide another anti-reflection article having the same desirable properties as those of one anti-reflection article at extremely low cost.

(3) The method of manufacturing the anti-reflection article according to the item (1) or (2), wherein the curable base is a UV light-curable resin.

According to the item (3), since the ultraviolet light-curable resin has excellent processing suitability in the molding process, the molding process may be performed with higher precision.

(4) The method of manufacturing the anti-reflection article according to the item (1) or (2), wherein the curable base is liquid glass.

According to the item (4), since liquid glass has high hardness in a cured sate, the durability of the anti-reflection article may foe further improved.

(5) An anti-reflection article that is manufactured by the method of manufacturing an anti-reflection article according to any one of the item (1) to (4), wherein the uneven shape is formed by a plurality of minute convex portions or minute concave portions adjacent to one another, and the gap between the minute convex portions or the minute concave portions is the shortest wavelength or less of a wavelength band of an electromagnetic wave for anti-reflection.

According to the item (5), it is possible to provide another anti-reflection article having the same desirable properties as those of an anti-reflection article at extremely low cost.

Effects of the Invention

It is possible to provide the anti-reflection article having desirable anti-reflection properties or abrasion resistance at extremely low cost.

Figure 1:
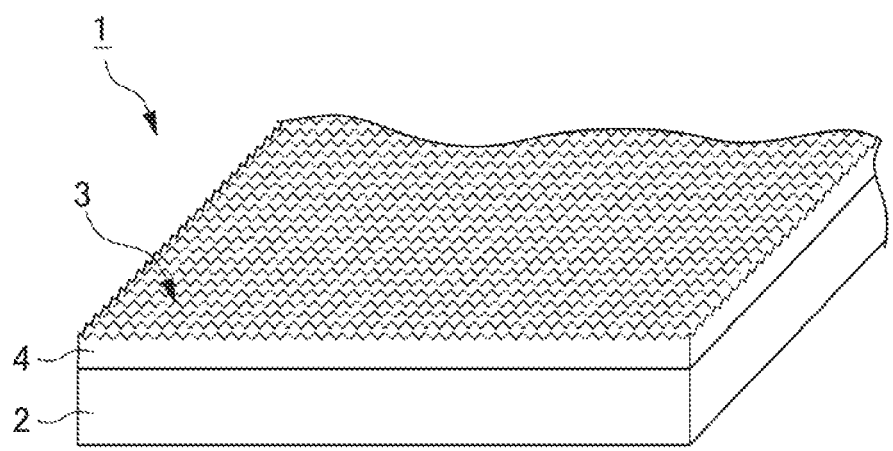
FIG. 1 is a conceptual perspective view that is provided to describe an anti-reflection article of the present invention.

EXPLANATION OF REFERENCE NUMERALS 1, 1A anti-reflection article
2, 2A base
3 anti-reflection surface
4 receptive layer
40 curable base
5, 5A anti-reflection article manufacturing mold plate
6 pressure roller

PREFERRED MODE FOR CARRYING OUT THE INVENTION

FIG. 1 is a diagram schematically illustrating the configuration of an anti-reflection article 1 as an anti-reflection article of the present invention. The anti-reflection article 1 has a configuration in which a surface of a base 2 1a provided with an anti-reflection surface 3 that is obtained by forming a moth eye structure with a minute uneven surface shape in a receptive layer 4 formed of a curable base material such as an ultraviolet light-curable resin.

Furthermore, the shape of the anti-reflection article is not limited to a flat film shape, and may be formed as a flat sheet shape or a flat plate shape (referred to a film, a sheet, and a plate based on the order of relative thinness). Furthermore, the film shape, the sheet shape, and the plate shape may have a curved shape or a three-dimensional shape instead of the flat shape. Moreover, a three-dimensional shape, such as various lenses and various prisms, may be appropriately employed in accordance with the application example.

The base 2 may use various transparent resin films of a cellulose (fiber) resin such as TAC (Triacetylcellulose), an acrylic resin such as PMMA (polymethylmethacrylate), a polyester resin such as PET (Polyethylene terephthalate), a polyolefin resin such as PP (polypropylene), a vinyl resin such as PVC (polyvinyl chloride), and PC (Polycarbonate), and the like. Furthermore, since the shape of the anti-reflection article is not limited to the film shape and may be various shapes, the base 2 may be formed of, for example, glass such as soda glass, potash glass, and lead glass, ceramics such as PLZT, or various transparent inorganic materials such as quartz and fluorite other than these materials in accordance with the shape of the anti-reflection article.

The anti-reflection surface 3 is formed so that the refractive index gradually changes in the thickness direction of the minute uneven surface shape, and may prevent the reflection of the incident light in a broad wavelength band by the principle of a moth eye structure. As the molding curable base material for molding that forms the anti-reflection surface 3, an acrylate ultraviolet light-curable resin may be desirably used. Furthermore, the present invention is not limited thereto, and various materials and various curable resins such as ultraviolet light-curable resins of epoxy and polyester, electron-ray curable resins of acrylate, epoxy, and polyester, or thermosetting resins of urethane, epoxy, and polysiloxane may be used. Moreover, the other thermoplastic resins may be also used by the heating and pressurizing molding process.

Figure 2:
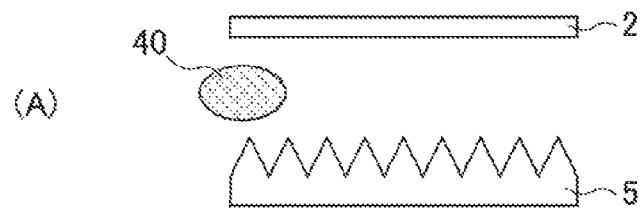
FIG. 2 is a diagram that is provided to describe the general manufacturing process of manufacturing the anti-reflection article by an anti-reflection article manufacturing mold plate.
Figure 2:
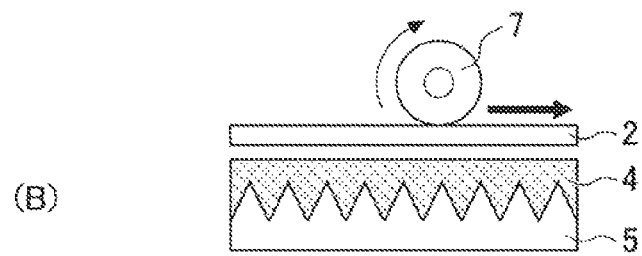
Figure 2:
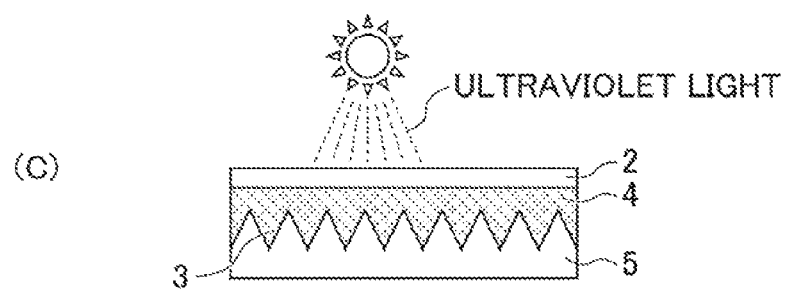
Figure 2:
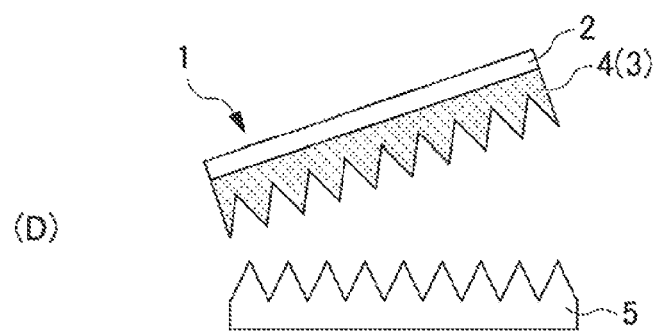

FIG. 2 is a diagram illustrating the process of the general method of manufacturing the anti-reflection article of the related art. In the manufacturing process, a curable base 40 is first applied to the base 2 by a die (not illustrated) (A). Furthermore, the application of the curable base 40 is not limited to the case of using the die, and various methods may be employed. Subsequently, an anti-reflection article manufacturing mold plate 5 and the base 2 are pressurized by a pressure roller 7 so that the curable base 40 adheres to the base 2 and the curable base 40 is sufficiently charged into the minute concave portions formed on the surface of the anti-reflection article manufacturing mold plate 5, thereby forming the receptive layer 4 (B). In this state, for example, when the curable base 40 is an ultraviolet light-curable resin, the curable base 40 is cured by the irradiation of ultraviolet light, so that the uneven shape of the anti-reflection surface 3 is formed on the surface of the receptive layer 4 (C). Subsequently, the base 2 is peeled off from the anti-reflection article manufacturing mold plate 5 through a peeling roller (not illustrated) (D).

In FIG. 2, in order to easily describe the method of manufacturing the anti-reflection article, a case has been described in which the anti-reflection article manufacturing mold plate 5 is formed in a sheet shape. However, for example, the uneven shape of the mold may be continuously molded in the elongated base 2 obtained by rolls according to a roll-to-roll process while using the anti-reflection article manufacturing mold plate 5 as a metallic roll-shaped mold, thereby mass-manufacturing an anti-reflection article having a moth eye structure with great efficiency.

Here, the uneven shape of the anti-reflection article manufacturing mold plate 5 may be formed by various methods of the related art. As a typical example, when the anti-reflection article manufacturing mold plate is a metallic mold, a minute uneven shape having a repetition period of a visible light wavelength or less may foe formed on the peripheral surface of a metallic base material by using aluminum anodization. For this reason, as the metallic mold, the base material may be formed of aluminum or may be formed in a manner such that an aluminum layer is formed directly on a surface of a base material of copper or the like or is formed thereon with various intermediate layers interposed therebetween. The uneven shape of the anti-reflection article manufacturing mold plate 5 formed as the metallic mold may be formed in a manner such that minute holes are densely formed in an aluminum layer of a metallic base material by repeating an anodization treatment and an etching treatment and the minute holes are dug so as to gradually increase the diameter of the minute holes. Accordingly, the metallic base material is provided with dense minute holes of which the hole diameter gradually decreases in the depth direction. By using such a mold as the anti-reflection article manufacturing mold plate 5, the surface of the anti-reflection article 1 may be provided with the minute uneven shape corresponding to the minute holes and the outermost surface layer may be laminated with Ni, Ti, Cr, SiO2, or the like.

Furthermore, the anti-reflection article manufacturing mold plate 5 may not foe essentially formed as the above-described mold, and a material obtained by winding resin, glass, or a film may be used as the base material of the anti-reflection article manufacturing mold plate 5. Then, the method of manufacturing the anti-reflection article manufacturing mold plate of the present invention may be, of course, desirably used to manufacture a molding plate other than the metallic molding plate.

Figure 3A:
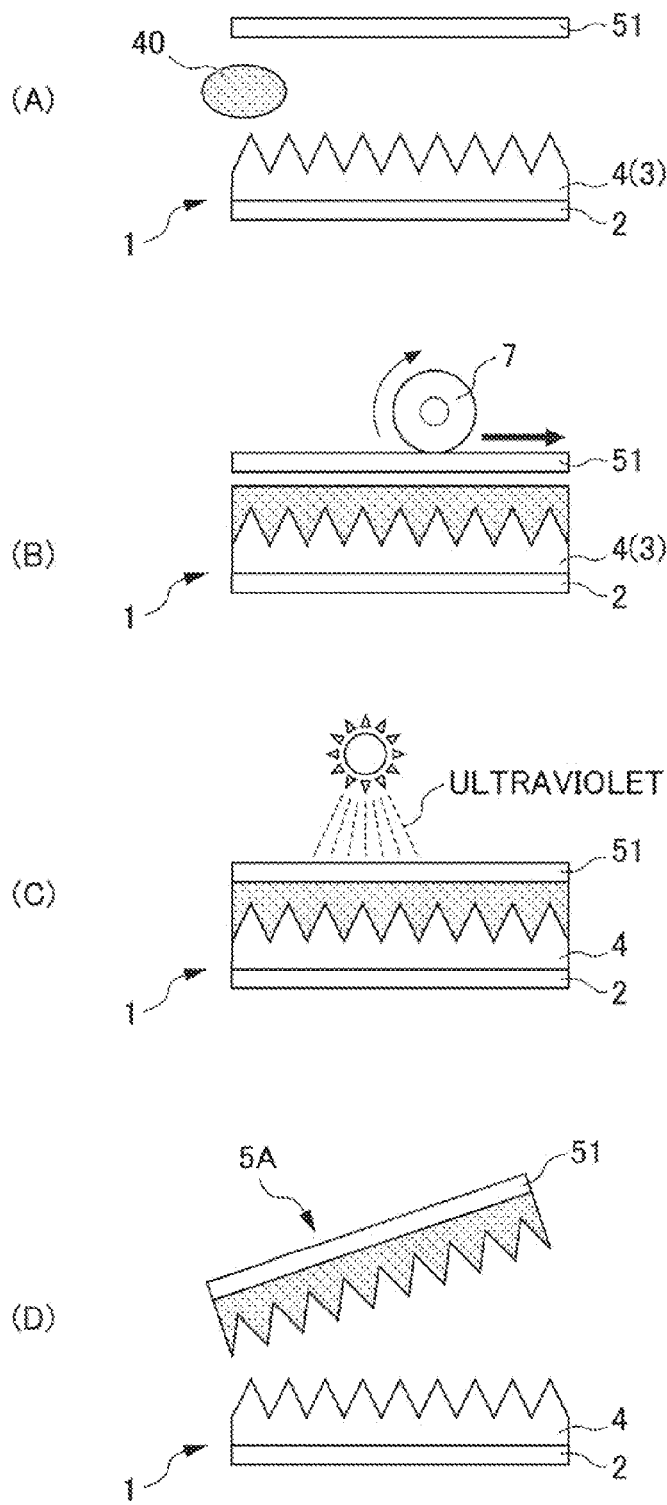
FIG. 3A is a diagram that is provided to describe the manufacturing process of manufacturing the anti-reflection article of the present invention according to a method of manufacturing an anti-reflection article of the present invention.
Figure 3B:
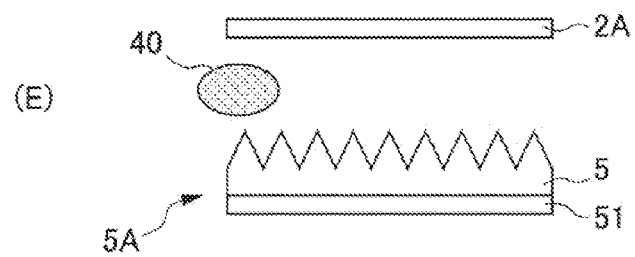
FIG. 3B is a diagram that is provided to describe a manufacturing process of manufacturing the anti-reflection article of the present invention according to a method of manufacturing an anti-reflection article of the present invention.
Figure 3B:
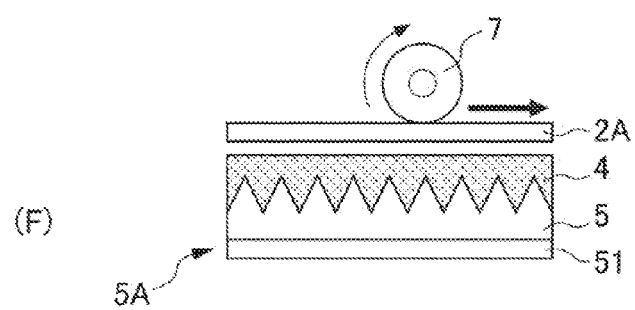
Figure 3B:
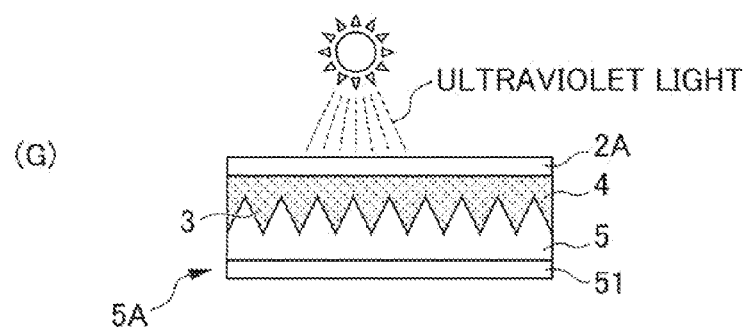
Figure 3B:
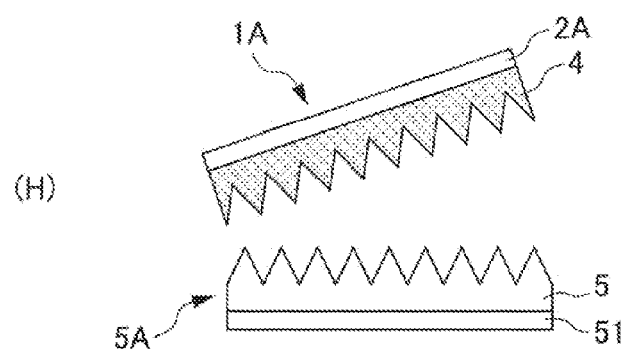

Next, FIGS. 3A and 3B are diagrams respectively illustrating the method of manufacturing the anti-reflection, article manufacturing mold plate of the present invention and the manufacturing process of the method of manufacturing the anti-reflection article. First, in the method of manufacturing the anti-reflection article manufacturing mold plate of the present invention, as in the above-described general method of manufacturing the anti-reflection article, the curable base 40 is first applied to an anti-reflection article manufacturing mold plate base 51 by a die (not illustrated) (A). The anti-reflection article manufacturing mold plate base 51 is not particularly limited, but TAC, PET, or the like may be desirably used. Furthermore, the application of the curable base 40 is not limited to the application method using the die, and various methods may be employed.

Subsequently, the pressure roller 7 pressurizes the anti-reflection article 1 as a molding target and the anti-reflection article manufacturing mold plate base 51, so that the curable base 40 adheres to the anti-reflection article manufacturing mold plate base 51, and the curable base 40 is sufficiently charged into the minute concave portions of the anti-reflection surface 3 of the anti-reflection article 1 (B). In this state, for example, when the curable base 40 is an ultraviolet light-curable resin, the curable base 40 is cured by the irradiation of the ultraviolet light so as to form a minute uneven surface shape (C). Subsequently, the anti-reflection article manufacturing mold plate base 51 is peeled off from the anti-reflection article 1 through a peeling roller (not illustrated) (D). By the above-described processes, an anti-reflection article manufacturing mold plate 5A of the present invention may be obtained by using the anti-reflection article 1 as the molding target.

The method of manufacturing the anti-reflection article of the present invention is a process of obtaining the anti-reflection article 1 by using the anti-reflection article manufacturing mold plate %A. As illustrated in FIG. 3B, an anti-reflection article 1A of the present invention may be manufactured by the same process (FIG. 2) as that of the general method of manufacturing the anti-reflection article except that the anti-reflection article manufacturing mold plate 5A obtained by using the anti-reflection article 1A as the molding target is used as the anti-reflection article manufacturing mold plate. Furthermore, if both ends of the anti-reflection article manufacturing mold plate 5A are formed so as to be continuous with each other in advance, for example, even when the anti-reflection article 1A has a cylindrical endless pattern, this pattern is continuously transferred, and hence a practical endless anti-reflection article manufacturing mold plate may be obtained.

FIG. 3B is a diagram illustrating the anti-reflection article manufacturing process of the present invention. In the manufacturing process, the curable base 40 is first applied to a base 2A by a die (not illustrated) (E). The application method is the same as the above-described general manufacturing method. Subsequently, the pressure roller 7 pressurizes the base 2A and the anti-reflection article manufacturing mold plate 5A obtained by using the anti-reflection article 1 as the molding target, so that the curable base 40 adheres to the base 2A and the curable base 40 is sufficiently charged info the minute concave portions formed on the surface of the anti-reflection article manufacturing mold plate 5A so as to form the receptive layer 4 (F: a molding process). In this state, for example, when the curable base 40 is an ultraviolet light-curable resin, the curable base 10 is cured by the irradiation of the ultraviolet light so that the uneven surface shape of the anti-reflection surface 3 is formed on the surface of the receptive layer 4 formed of the curable base 40 (G: a curing process). Subsequently, the base 2A is peeled off from, the anti-reflection article manufacturing mold plate 5A through a peeling roller (not illustrated) (H: a peeling process). According to the above-described processes, since an expensive mold or the like is not needed, the anti-reflection article 1A may be manufactured at extremely low cost.

Furthermore, an ultraviolet-light curable resin including urethane acrylate, acrylate monomer and acrylic acid 2-hydroxypropyl and liquid glass may be used as the curable base 40 that is used in the manufacturing method of the present invention. Also, a thermosetting resin, water glass, and a curable resin such as an acrylate resin (an instant adhesive or the like) may be appropriately used. Among these, the ultraviolet light-curable resin or the liquid glass may be particularly desirably used as the curable base 40.

When the ultraviolet light-curable resin is used as the curable base 40, the resin known in the related art may be used without any particular limitation. Specifically, a commercial product "3021 J" (manufactured by Threebond Co., Ltd.), which may be easily obtained from the market, is desirably used. For the ultraviolet light-curable resin, an adjustment of its dripping amount (viscosity and minute amount application suitability via surface tension) and a curing treatment are easy, and a thermal dependency is little. Thus, post-deformation, such as a change in dimension according to a temperature, hardly occurs. Moreover, since the ultraviolet light-curable resin may reduce the influence of the change in volume caused by the curing reaction and the hardness of the material may be adjusted, the processing suitability of the molding process is excellent. Accordingly, the ultraviolet light-curable resin is appropriate as the curable base 40 in that the molding process may be performed with higher precision.

When the liquid glass is used as the curable base 40, the liquid glass known in the related art may be used without any particular limitation. The liquid glass mainly includes a silica solution of silicon dioxide (SiO2) and exists as a liquid inside a sealed container at an ordinary temperature. When the liquid glass is applied to the object surface and comes into contact with air, the liquid glass is cured to thereby become solid glass. Specifically, a commercial product of "ordinary temperature stable glass (glass paint)" (manufactured by Glass Coating Material Division, Mokuteck. K.), which may be easily obtained from the market, is desirably used. The liquid glass has high hardness and has excellent durability when the liquid glass is used as the molding plate. Accordingly, the liquid glass is desirable as the curable base 40 in that the durability of the anti-reflection article manufacturing mold plate may be further improved. Furthermore, the curing treatment is comparatively easily performed in the liquid glass. Then, particularly when solvent is selected, the surface tension may be adjusted and a change in volume during the hardening process may be suppressed.

Furthermore, in the minute uneven surface shape that is formed in the anti-reflection surface 3 of the anti-reflection article 1, the convex portion may have a single peak or the convex portion may have multiple peaks. However, the present invention is not limited thereto. For example, it is more desirable to use a convex portion with multiple peaks so that at least a part of the convex portion includes multiple peaks. In the multi-peak convex portion with multiple peaks, the thickness of the hemline portion with respect to the dimension of the vicinity of the peak is relatively thickened compared to the single-peak convex portion. Accordingly, it is possible to mention that the multi-peak convex portion has excellent mechanical strength compared to the single-peak convex portion. Accordingly, when there is the multi-peak convex portion with multiple peaks, it is considered that abrasion resistance is improved in the anti-reflection article compared to only the single-peak convex portion. Specifically, when an external force is applied to the anti-reflection article, the external force is received by multiple peaks compared to the case of only the single-peak convex portion, so that the external force applied to the respective peaks may be reduced and the convex portion is not easily damaged. Accordingly, the local degradation of the anti-reflection function is reduced, and hence the occurrence of poor appearance may foe further reduced.

Furthermore, the minute uneven surface shape that is formed in the anti-reflection surface 3 may be formed as a shape in which the above-described convex portion is inverted to a concave portion. Even by forming the surface shape of the anti-reflection surface 3 as being a reversed uneven shape the desired optical properties may be substantially obtained. Additionally, the molding plate for molding such a surface uneven shape has a merit in that the abrasion resistance is excellent due to the above-described reason.

(Other Embodiments)

While the specific configuration of the embodiment of the present invention has been described in detail, the configuration of the above-described embodiment of the present invention may be modified into various forms without departing from the spirit of the present invention and can also be combined with the configuration of the related art.

The anti-reflection article of the present invention may improve visibility while being applied to the front surfaces of various image display panels such as a liquid crystal display panel, an electroluminescent display panel, and a plasma display panel. Furthermore, the present invention is not limited thereto. For example, the anti-reflection article may be widely applied to the case where the anti-reflection article is applied to the rear surface of the liquid crystal display panel so as to reduce reflection loss of the incident light from the backlight to the liquid crystal display panel (the case where the incident light utilization efficiency is improved). Furthermore, the front surface of the image display panel is an image light emission surface of the image display panel and is also the image observer side surface. Furthermore, the rear surface of the image display panel is the surface opposite to the front surface of the image display panel and is also the surface to which illumination light is incident from the backlight in the case of a transparent image display device that uses the backlight (the back light source).

Furthermore, in the above-described embodiment, as illustrated in FIG. 1, a double-layer lamination structure is presented in which the anti-reflection surface 3 having a minute uneven shape formed of the curable base 40 is formed on one surface of the base 2. However, the anti-reflection article 1 of the present invention may be a single-layer lamination structure in which the minute concave portion is directly molded on one surface of the base 2 without using any other layer. Alternatively, the anti-reflection article 1 may be a lamination structure with three or more layers obtained by forming the anti-reflection surface 3 on one surface of the base 2 with the intermediate layers (layers that improve adhesion between layers, suitability for coating, and base material surface performance such as surface smoothness, and the layers are also referred to primary layers, anchor layers, or the like) having one or more layers interposed therebetween.

Moreover, in the above-described embodiment, as illustrated in FIG. 1, the anti-reflection surface 3 is formed on only one surface of the base 2, but the anti-reflection surface 3 may be formed on both surfaces of the base 2. Furthermore, the anti-reflection article 1 may be formed as an attachable article in which various adhesive layers are formed on the surface opposite to the anti-reflection surface 3 and a peelable film (peelable paper) is laminated on the surface of the adhesive layers so as to be peelable as embodiments of adhesion processing articles. In such an embodiment, the anti-reflection article 1 of the present invention may be attached onto a desired surface of a desired article by the adhesive layer after peeling off the peelable film so as to expose the adhesive layer. Accordingly, a desired article may simply have an anti-reflection property. Various existing adhesives such as an adhesive (pressure-sensitive adhesive), a two-component curable adhesive, a UV curable adhesive, a thermosetting adhesive, and a hot-melt adhesive may be used as the adhesive.

Furthermore, the anti-reflection article 1 may be stored, transported, sold, and post-processed while a peelable protection film is temporarily attached onto the anti-reflection surface 3, and the protection film may be peeled off at an appropriate time later. In such an embodiment, it is possible to prevent degradation in the anti-reflection property due to the damage or the contamination of the uneven surface portion during storage and transportation.

Furthermore, the anti-reflection article 1 may be applied to various application examples other than the case where the film-shaped anti-reflection article is applied to the front surface of the image display panel or the illumination light incident surface. Specifically, the anti-reflection article may be applied to a touch panel provided on the screen of an image display panel with a gap therebetween, various windows, or the rear surface (an image display panel side) of a front-surface-side member such as various optical filters. Furthermore, in this case, there is an effect in which an interference fringe, such as Newton ring formed by the interference of light between the image display panel and the surface-side member, is prevented, a ghost image formed by the multi-reflection between the emission surface of the image display panel and the light incident surface of the surface-side member is prevented, and the reflection loss of the image light emitted from the screen and entering the surface-side member is reduced.

Furthermore, the anti-reflection article may be applied to the front surface (an external world side) or both surfaces, the front surface and the rear surface (a goods or exhibited object side), of a glass plate used in the show window or goods display cabinet of a shop or a display window or a goods display cabinet for an exhibited object in a museum. Furthermore, in this case, it is possible to improve the visibility for a tourist or a customer of an art collection or goods by the anti-light-reflection function of the front surface of the glass plate.

Furthermore, the anti-reflection article may be widely used for a case where the anti-reflection article is applied to the front surface of a prism or a lens used in various optical units such as spectacles, a telescope, a camera, a video camera, a gun's sight mirror (sniper's scope), binoculars, and a periscope. In this case, it is possible to improve visibility by the anti-light-reflection function of the front surface of the lens or the prism. Furthermore, the anti-reflection article may be also applied in the case where the anti-reflection article is applied to the front surface of a printed portion (including characters, pictures, and diagrams) of a book, and may improve the visibility of characters and the like by preventing the light reflection of the front surface of the characters and the like. Furthermore, the anti-reflection article may be also applied to the front surface of a signboard, a poster, and various displays (a direction guide, a map, a no-smoking sign, an entrance sign, an emergency exit sign, or a restricted area sign) in various shops, streets, and outer walls, and may improve the visibility thereof. Furthermore, the anti-reflection article may be also applied to the light incident surface of a window material (also serving as a diffuser plate, a light collecting lens, and an optical filter in some cases) of an illumination unit using a white bulb, a light emitting diode, a fluorescent lamp, a mercury lamp, or EL (electroluminescence). Accordingly, the anti-reflection article may prevent the light reflection of the light incident surface of the window material, and may reduce the reflection loss of the light from the light source, and may improve the light utilization efficiency. Furthermore, the anti-reflection article may be also applied to the display window surface (a display observer side) of a clock or various measurement units, and may improve the visibility by preventing the light reflection of the display window surface.

Furthermore, the anti-reflection article may be also applied to the front surface of an indoor side, an outdoor side, or both sides of a control cabin (an operation cabin or a steering cabin) of a conveyance such as an automobile, a railroad vehicle, a ship, and an airplane, and may improve the visibility of a controller (an operator or a steering person) of the external world by the anti-reflection of the indoor external light of the window. Furthermore, the anti-reflection article may be also applied to the front surface of a window or a lens of a night-vision device used for a security monitoring operation, the focusing operation of a gun, and an astronomical observing operation, and may improve the visibility at night time or in a dark place.

Furthermore, the anti-reflection article may be also applied to the front surface (an indoor side, an outdoor side, or both sides) of a transparent substrate (a window glass or the like) forming a window, a door, a partition, or a wall surface of a building such as a house, a shop, an office, a school, and a hospital, and may improve visibility of the external world or the daylight efficiency. Furthermore, the anti-reflection article may be also applied to the front surface of a transparent sheet or a transparent plate (window material) of a greenhouse or an agricultural vinyl greenhouse, and may improve the daylight efficiency of the sunlight. Furthermore, the anti-reflection article may be also applied to the front surface of a solar cell, and may improve the utilization efficiency (generation efficiency) of the sunlight.

In the above-described various embodiments, in a case where the film-shaped anti-reflection article of the present invention is applied to the front surface, the rear surface, or both surfaces of the transparent substrate such as a glass plate, the anti-reflection article may be applied to only a partial area instead of applying or coating the anti-reflection article onto the entire surface of the transparent substrate. As such an example, for example, the film-shaped anti-reflection article may adhere to only an indoor side surface in a rectangular area of a center portion in one window glass, and the anti-reflection article does not adhere to other areas. In a case where the anti-reflection article is applied to only a partial area of the transparent substrate, it is easy to visually recognize the existence of the transparent substrate even when a particular display or a collision prevention object is not provided. Accordingly, it is possible to obtain an effect of suppressing a risk in which a person is injured by a collision with the transparent substrate and an effect of simultaneously preventing an indoor (interior) visible state and realizing a visible state (in an area provided with the anti-reflection article) of the transparent substrate.

The invention claimed is:

1. A method of manufacturing a new mold plate for manufacturing anti-reflection articles that each comprise a transparent base with an anti-reflection surface formed from a cured resin on a surface of the transparent base, the method comprising:
    (i) manufacturing a first plurality of the anti-reflection articles using an existing mold plate;
    (ii) pressure-contacting a surface of a receptive layer that includes a curable base with the anti-reflection surface of an individual anti-reflection article of the first plurality of anti-reflection articles to mold an uneven shape on the surface of the receptive layer; and
    (iii) curing the curable base of the receptive layer on which the uneven shape is molded to obtain the new mold plate for manufacturing a second plurality of the anti-reflection articles,
    wherein the uneven shape of the new mold plate mirrors the anti-reflection surface of the individual anti-reflection article, which includes at least one of minute convex portions or minute concave portions that are densely arranged such that gaps between adjacent portions are as short or shorter than a shortest wavelength of a wavelength band for anti-reflection.

2. A method of manufacturing anti-reflection articles, comprising manufacturing the second plurality of anti-reflection articles using the new mold plate obtained by the method of claim 1.

3. The method of claim 1, wherein the curable base is an ultraviolet light-curable resin.

4. The method of claim 1, wherein the curable base is liquid glass.

5. A method of manufacturing anti-reflection articles that each comprise a transparent base with an anti-reflection surface formed from a cured resin on a surface of the transparent base, the method comprising:
    (i) manufacturing a first plurality of the anti-reflection articles using an existing mold plate;
    (ii) pressure-contacting a surface of a receptive layer that includes a curable base with the anti-reflection surface of an individual anti-reflection article of the first plurality of anti-reflection articles to mold an uneven shape on the surface of the receptive layer;
    (iii) curing the curable base of the receptive layer on which the uneven shape is molded to obtain a new mold plate; and
    (iv) manufacturing a second plurality of the anti-reflection articles using the new mold plate,
    wherein the uneven shape of the new mold plate mirrors the anti-reflection surface of the individual anti-reflection article, which includes at least one of minute convex portions or minute concave portions that are densely arranged such that gaps between adjacent portions are as short or shorter than a shortest wavelength of a wavelength band for anti-reflection.

6. The method of claim 5, wherein the curable base is an ultraviolet light-curable resin.

7. The method of claim 5, wherein the curable base is liquid glass.

8. The method of claim 5, wherein the new mold plate replaces the existing mold plate in the manufacture of the anti-reflection articles.

* * * * *